United States Patent [19]

Min

[11] 4,274,522
[45] Jun. 23, 1981

[54] LOW SPEED ADAPTOR

[76] Inventor: Cheu H. Min, 81, Sec. 6, Tswei Hua St., Pan Chiao City, Taiwan

[21] Appl. No.: 918

[22] Filed: Jan. 4, 1979

[51] Int. Cl.³ .............................................. F16D 67/06
[52] U.S. Cl. ........................................ 192/9; 74/661;
112/220; 112/277; 192/12 D; 192/84 R
[58] Field of Search ........... 192/9, 12 D, 53 D, 84 A, 192/84 R; 112/220, 277, 217.3, 217.4; 74/661, 190, 190.5, 194, 199

[56] References Cited

U.S. PATENT DOCUMENTS

| | | | |
|---|---|---|---|
| 2,233,060 | 2/1941 | Parvin | 192/12 D X |
| 2,883,018 | 4/1959 | Winz | 192/12 D |
| 3,106,106 | 10/1963 | Byrne | 74/661 |
| 3,310,141 | 3/1967 | Smirl | 192/84 A |
| 3,587,797 | 6/1971 | Szekely | 192/9 X |
| 3,739,734 | 6/1973 | Princiotta et al. | 112/277 |
| 3,799,089 | 3/1974 | Tolle | 112/217.3 |
| 3,924,550 | 12/1975 | Boser et al. | 112/277 X |
| 4,098,206 | 7/1978 | Suchsland et al. | 112/220 |
| 4,183,312 | 1/1980 | Angersbach et al. | 112/277 |

FOREIGN PATENT DOCUMENTS 751427  9/1933  France ........................................ 192/9

OTHER PUBLICATIONS

"Developments to Watch", Cam-Operated Clutch, Product Engineering, vol. 32, No. 7, p. 8, 2/13/61.

Primary Examiner—C.J. Husar
Assistant Examiner—Moshe I. Cohen
Attorney, Agent, or Firm—Tak Ki Sung

[57] ABSTRACT

A low speed adaptor for use in a sewing machine driven by a main motor, particularly to one which employs a main transmission belt and an auxiliary transmission belt to change the speed of the sewing machine from high to low. This main transmission belt passes over the belt pulley of the main motor, then over the transmission belt pulley of the adaptor, and then over the belt pulley of the sewing machine; while, the auxiliary transmission belt passes over the belt pulley of the auxiliary motor and over the belt pulley of the adaptor body. The adaptor comprises an electromagnetic clutch and brake device capable of selectively switching the drive of the sewing machine from the main motor operating at high speed to the auxiliary motor operating at low speed.

4 Claims, 2 Drawing Figures

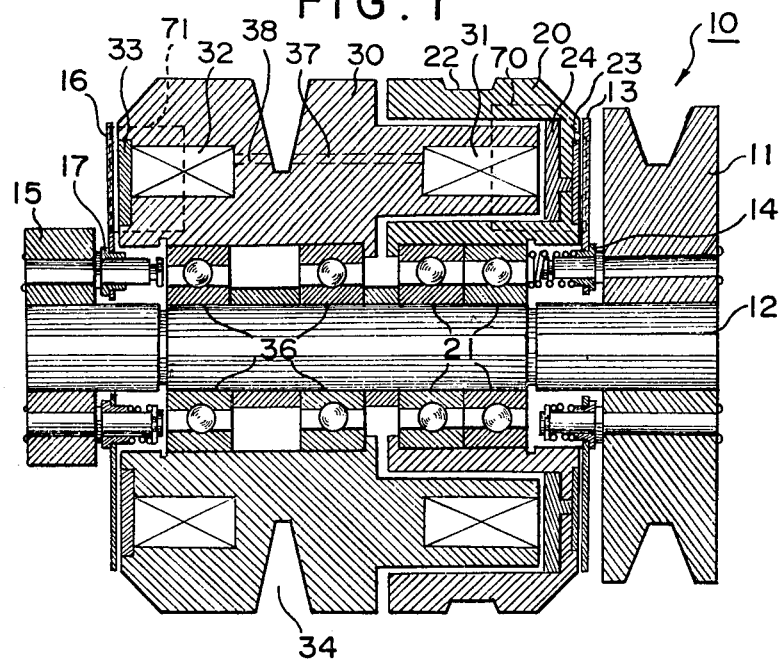
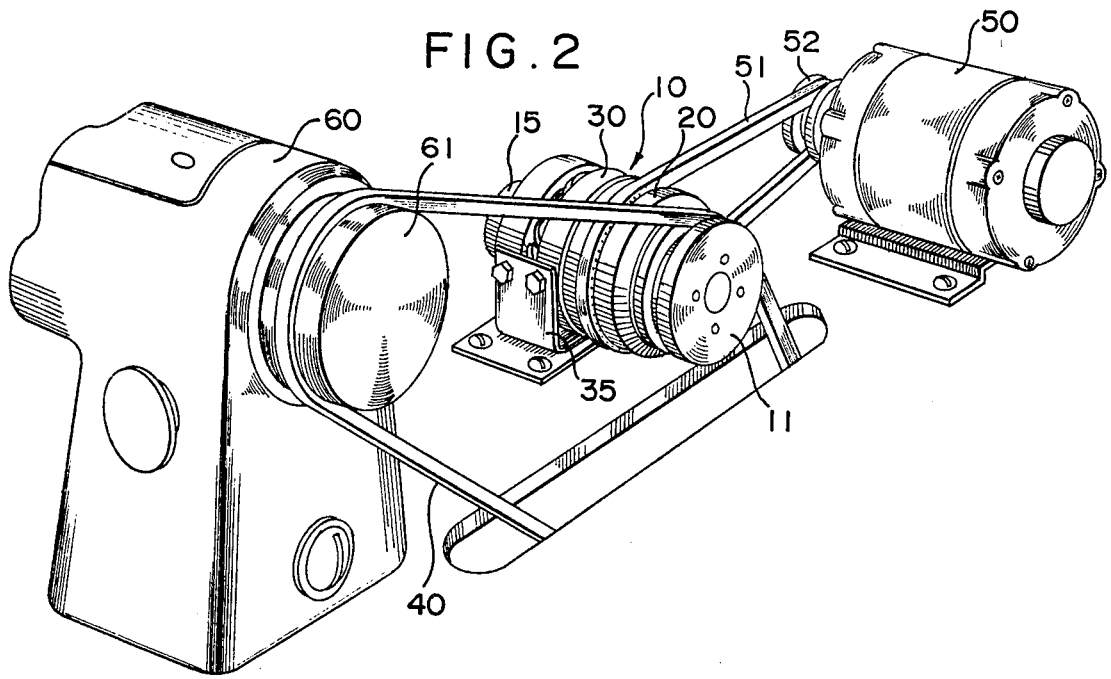

LOW SPEED ADAPTOR

BACKGROUND OF THE PRESENT INVENTION

Since the conventional electric sewing machines are of high speed types, they cannot be converted into automatic sewing machines particularly when automatic positioning and thread cutting device are required.

Nowadays, there are some new electric sewing machines which have low speed devices for automatic positioning and thread cutting; but since the low speed devices are integral with the machine itself, they cannot be converted for use in conventional electric sewing machines.

To obviate this, a low speed adaptor equipped with three transmission belts has been suggested, but since this one has two connecting windings and a transmission belt pulley which slides longitudinally along the shaft, it is not stable and is easy to breakdown. Besides, it also has conductive wires of the connecting windings threaded through the center hole in the shaft, which makes it difficult to manufacture.

Therefore, the object of the invention is to obviate all of the abovementioned drawbacks and to provide a low speed adaptor which is simple in construction, easy to assemble and suitable for use on any type of electric sewing machines.

BRIEF DESCRIPTION OF THE DRAWINGS

Other objects and advantages will become apparent as the invention is now described in detail with reference to the appended drawings, wherein:

FIG. 1 is a view in longitudinal section of an adaptor according to the present invention;

FIG. 2 is an oblique view of the present invention.

DETAILED DESCRIPTION OF THE INVENTION

As shown in FIG. 1 the invention has the provision of a low speed adaptor 10. At one end of the low speed adaptor 10, there is a transmission belt pulley 11 secured to a transmission shaft 12, which is provided within bearings 21—21 of the clutch member 20 and the bearings 36—36 of the adaptor body 30. When the transmission shaft 12 rotates, the clutch member 20 will not rotate with it. The clutch disc 13 of ferromagnetic material is secured at the transmission belt pulley 11 by a mounting sleeve or stationary seat 14 whereby the clutch disc 13, transmission belt pulley 11 and transmission shaft 12 rotate together. At one end of the transmission shaft 12, i.e., opposite to the transmission belt pulley 11, a brake wheel 15 is secured, a brake disc 16 of ferromagnetic material is secured to the brake wheel 15 by a mounting sleeve or stationary seat 17 whereby the brake wheel 15, the brake disc 16 and transmission shaft 12 rotate together. The mounting sleeves 14 and 17 are slidably mounted on the studs fixed onto the belt pulley 11 and the brake wheel 15 respectively, thus slight axial movement of the clutch disc 13 and the brake disc 16 with respect to the belt pulley 11 and the brake wheel 15 are permitted.

Serving also as a low speed transmission belt pulley, the clutch member 20 has a grooved rim 22 for placing the auxiliary transmission belt. Also shown in FIG. 1, there is a friction lining 23 at a corresponding position of the clutch member 20 to the clutch disc 13. Between the clutch disc 13 and the friction lining 23, there is a clearance, so as to enable the clutch disc 13 to be capable of frictional engagement with the clutch member 20 and then to perform the transmission of speed between the belt pulley 11 and the clutch member 20. The clutch member 20 is composed of a non-magnetic material 24 e.g., aluminum to increase the magnetic reluctance which is the resistance to flow of magnetic flux.

Also as it is shown in FIG. 1, a clutch winding 31 is placed within a grooved rim at the one end of the adaptor body 30 adjacent the clutch member whereby magnetic force is developed when energized to pull the clutch disc 13 towards the clutch member 20. A brake winding 32 is also placed within a grooved rim at the other end of the adaptor body 30 adjacent the brake disc 16 whereby a magnetic force is developed to pull the brake disc 16 towards the adaptor body 30 to perform braking, or to stop the rotation of the transmission shaft 12. As is clear from FIG. 1, under normal conditions, i.e. when the brake winding or the clutch winding is not energized, clutch disc 13 and brake disc 16 are urged away from clutch member 20 and brake wheel 15 by spring means.

At the outer side of the brake winding 32, a friction lining 33 is provided. Between the friction lining 33 and the brake disc 16, a clearance is constituted so as to enable the brake disc 16 to move axially to be engaged with the adaptor body 30 by friction to further form desired braking. There is a grooved rim 34 on the adaptor body 30 to carry the conductors of the winding 31 and the winding 32 by means that the conductors are threaded respectively through the holes 37 and 38 and further wound within the grooved rim 34.

As shown in FIG. 2, the adaptor 10 is placed between an auxiliary motor 50 and a sewing machine 60. This adaptor 10 is fixed by the stationary piece 35. The main transmission belt 40, which is driven by the main motor (not shown in the drawing) installed under the machine table, is looped around the transmission belt pulley 11 of the adaptor 10, further around the belt pulley 61 of the sewing machine 60, and further around a belt pulley (not shown in the drawing) at one end of the main motor. An auxiliary transmission belt 51, which is driven by the auxiliary motor 50, is looped around the grooved rim 22 of the clutch member 20 of the adaptor 10 and further around the belt pulley 52 at one end of the auxiliary motor 50.

When the sewing machine starts to operate, the main motor and the auxiliary motor 50 rotate simultaneously. During normal operation, because the clutch winding 31 of the adaptor 10 is not energized, the transmission belt pulley, being driven by the main transmission belt 40, rotates at a high speed, therefore sewing is performed at a high speed. In the meantime, as the clutch member 20 which is driven by the auxiliary motor 50 is disengaged from the clutch disc 13, the rotation of the transmission belt pulley 11 is performed solely by the main motor. As shown in FIG. 1, in the case where low speed sewing is desired i.e., where automatic positioning and thread cutting are involved, the required steps of operation thereof are: (1) stop the main motor (not shown in the drawing): (2) energize the clutch winding 31 of the adaptor 10 to produce a magnetic flux which passes through the adaptor body 30, the clutch member 20, the clutch disc 13, then again to the clutch member 20 and then returns to the adaptor body 30 along magnetic path 70, as shown in FIG. 1.

Therefore, the clutch disc 13 is attracted or pulled towards the rotating clutch member 20 engaged with the lining 23 by friction, whereby the low speed of the auxiliary motor 50 is transmitted through the auxiliary transmission belt 51, the transmission belt pulley 11, and further through the main transmission belt to make the sewing machine undergo a low speed sewing.

When the low speed sewing is about to end, it is required to stop engaging the clutch winding 31 to make the clutch disc 13 return to its original position. In the mean time, it is also required to energize winding 32 whereby a therefore produced magnetic flux passes through the adaptor body 30, the brake disc 16 and returns to the adaptor body 30 to constitute a magnetic path 71. As a result, the brake disc is attracted or pulled towards the adaptor body 30 to engage the lining 33 by friction, so that the brake disc 16, the brake wheel 15, the transmission shaft 12 and the transmission belt pulley 11, all of them rotating, are braked. Thus the sewing machine 60 is stopped due to the braking.

As described previously in the above, the invention utilizes only two transmission belts to switch the operation of a sewing machine from a high speed to a low speed. Aside from that, the adaptor is easily installed on the machine table, and is suitable for use with for every kind of sewing machine, even the old ones.

What I claim is:

1. An adaptor for changing the sewing speed of a sewing machine driven by a main motor comprising:
   a clutch member having a grooved rim to serve as a first transmission belt pulley adapted for engaging, by means of a first transmission belt, the pulley of an auxiliary motor rotating at a low speed;
   an adaptor body provided with a grooved rim, a clutch winding at one end and a brake winding at the other end to provide distinct magnetic paths when energized, said clutch member being disposed adjacent to said clutch winding;
   a shaft having two ends and on which said adaptor body and clutch member are rotatably mounted, said shaft extending through the central axis of said adaptor body and said clutch member;
   a second transmission pulley which is secured to one end of said shaft, said second transmission pulley being adapted to engage the pulleys of the sewing machine and the main motor by means of a second transmission belt;
   a clutch disc secured to said second transmission pulley and normally urged away from said clutch member, said clutch disc being formed of a material capable of being attracted by the magnetism generated in said clutch winding upon energizing thereof whereby said clutch disc slides along the longitudinal axis of said shaft to frictionally engage said clutch member;
   a brake wheel secured at the other end of said shaft;
   a brake disc secured to said brake wheel and normally urged away from said brake wheel, said brake disc being formed of a material capable of being attracted by the magnetism generated in said brake winding upon energizing thereof whereby said brake disc slides along the longitudinal axis of said shaft to frictionally engage said brake wheel.

2. The adaptor of claim 1 wherein the surface on said clutch member coming into contact with said clutch disc is provided with a friction lining.

3. The adaptor of claim 1 wherein the surface on said brake wheel coming into contact with said brake disc is provided with a friction lining.

4. The adaptor of claim 1 wherein the surfaces on said clutch member and said brake wheel coming into contact with said clutch disc and said brake disc, respectively, are provided with friction linings.

* * * * *

UNITED STATES PATENT AND TRADEMARK OFFICE
CERTIFICATE OF CORRECTION

PATENT NO. : 4,274,522
DATED : July 12, 1981
INVENTOR(S) : Hsu Min Chu

It is certified that error appears in the above—identified patent and that said Letters Patent is hereby corrected as shown below:

Page 1, item [76], the inventor's name should read as follows:

Hsu Min Chu

*Signed and Sealed this*

*Fifteenth* Day of *September 1981*

[SEAL]

*Attest:*

GERALD J. MOSSINGHOFF

*Attesting Officer*     *Commissioner of Patents and Trademarks*